Sept. 28, 1926.  
W. R. POLSON ET AL  
1,601,603  
WATER LIFTING APPARATUS  
Filed Oct. 26, 1925  
3 Sheets-Sheet 1
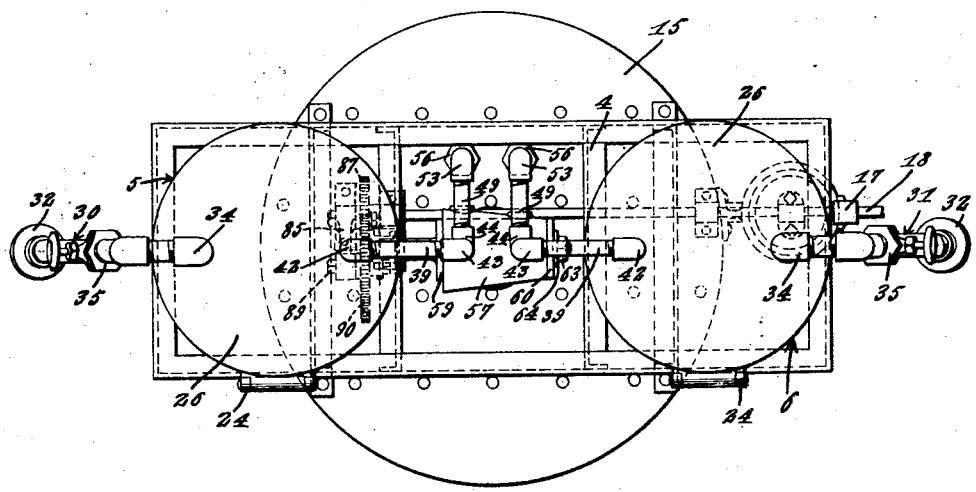
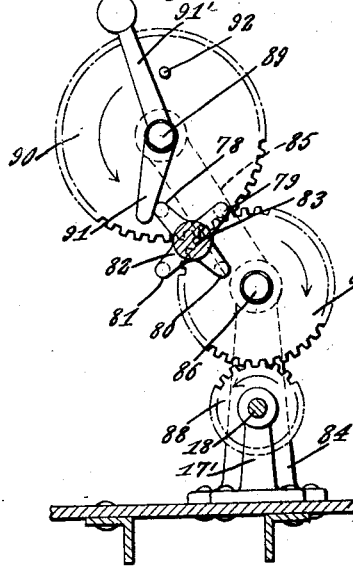
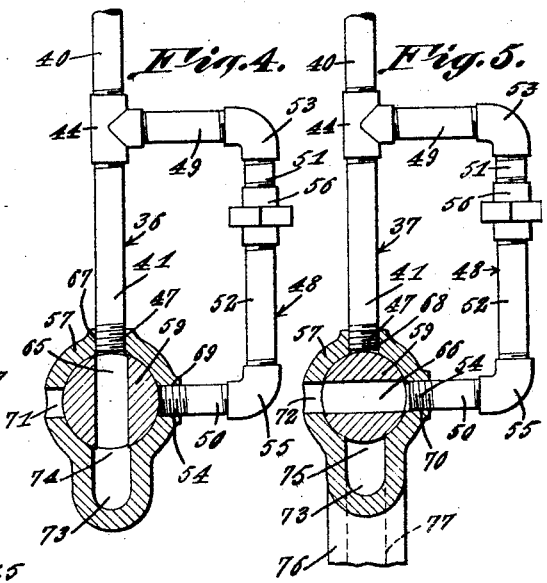
INVENTORS.  
*William R. Polson*  
BY AND *Harry C. Evans*,
*Geo. P. Kimmel*  ATTORNEY.

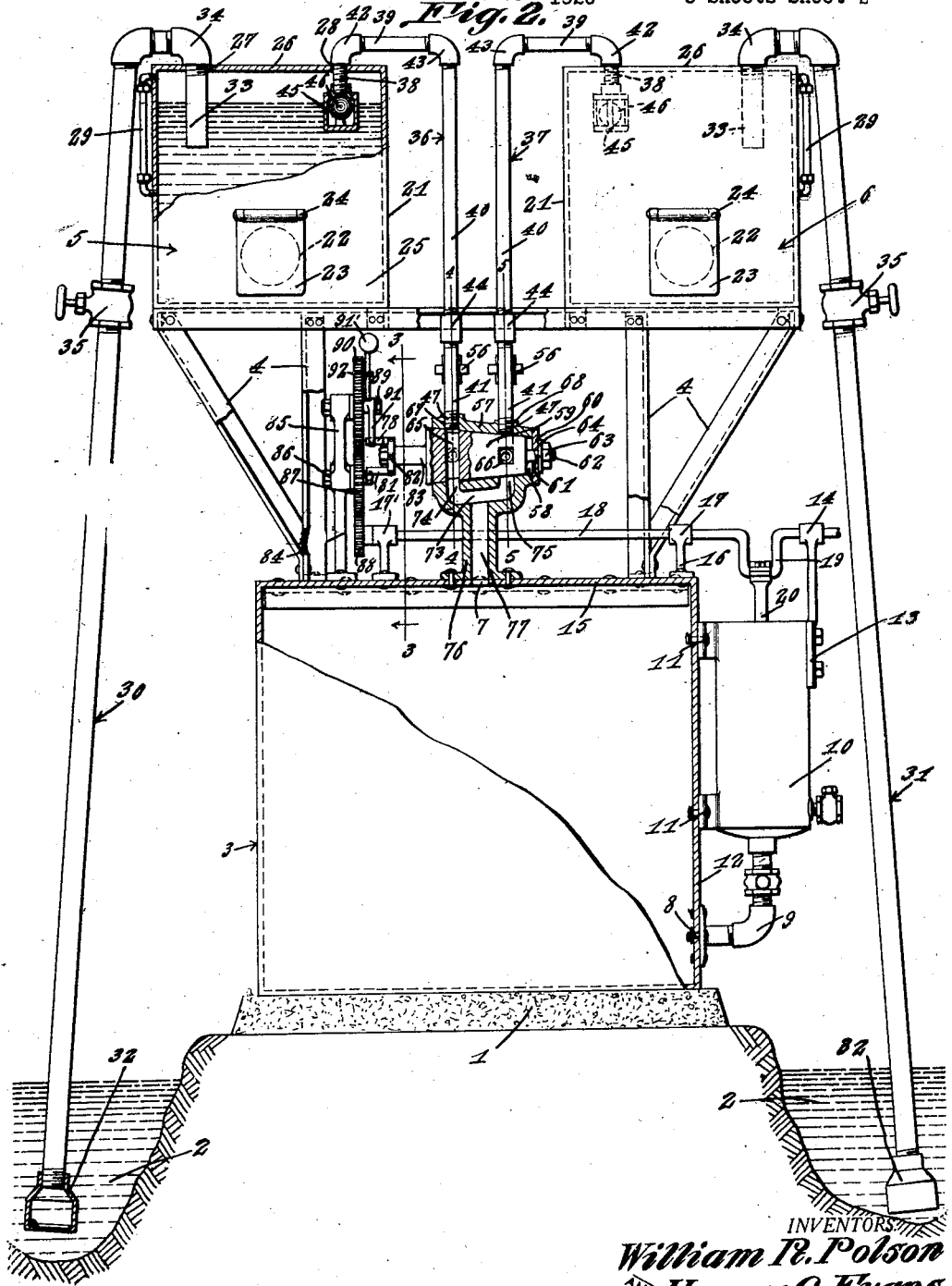

Sept. 28, 1926.  
W. R. POLSON ET AL  
1,601,603  
WATER LIFTING APPARATUS  
Filed Oct. 26, 1925 3 Sheets-Sheet 3
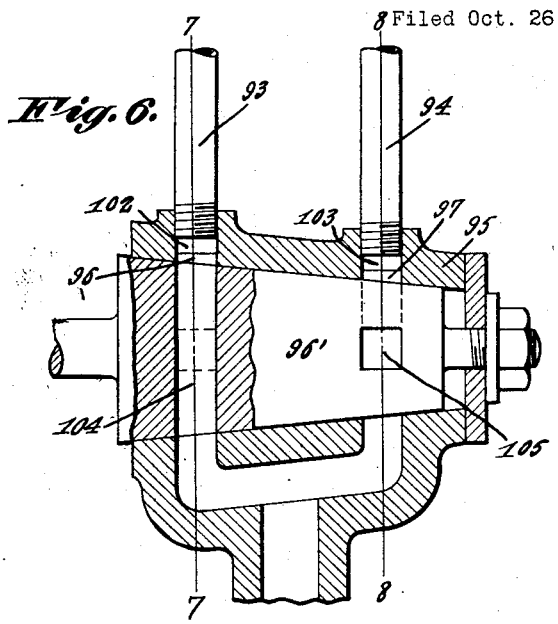
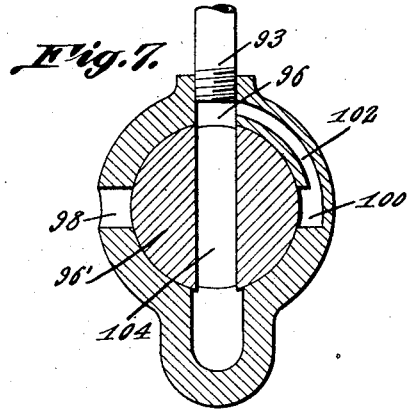
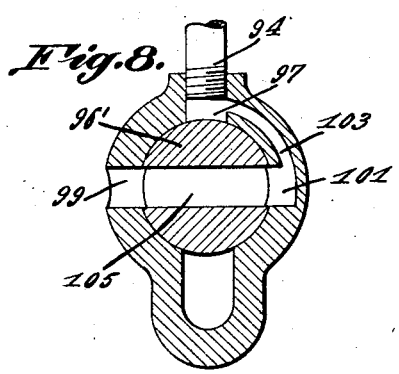
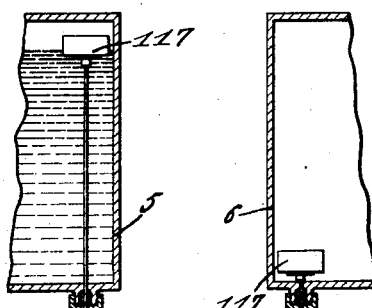
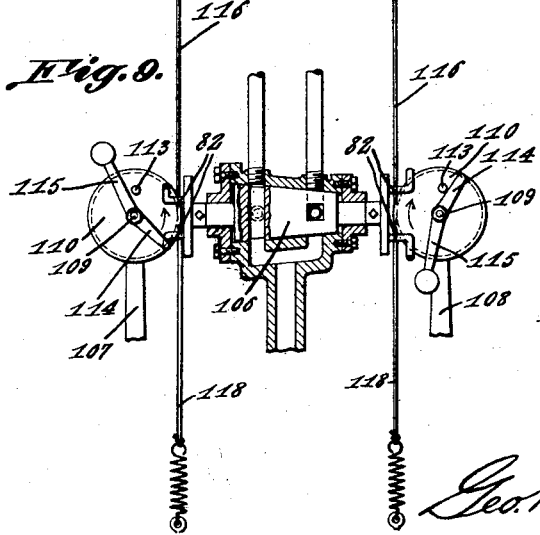
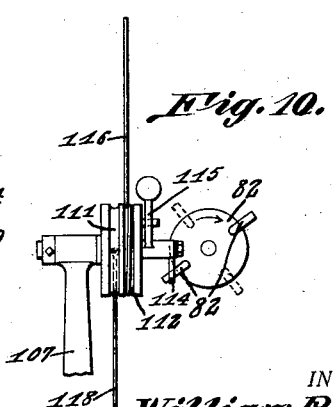
INVENTORS.  
*William R. Polson*  
BY AND *Harry C. Evans*  
*Geo. P. Kimmel* ATTORNEY.

Patented Sept. 28, 1926.

1,601,603

UNITED STATES PATENT OFFICE.

WILLIAM R. POLSON AND HARRY C. EVANS, OF BRUNEAU, IDAHO.

WATER-LIFTING APPARATUS.

Application filed October 26, 1925. Serial No. 65,007.

This invention relates to a liquid lifting apparatus designed primarily for lifting water, but it is to be understood that it can be used for any purposes for which it is found applicable, and has for its object to provide, in a manner as hereinafter set forth, a new, novel and efficient form of apparatus of the class referred to, for alternately and expeditiously lifting, by vacuum, water or other liquid to one or more receivers from which the water or liquid is discharged automatically.

Further objects of the invention are to provide, in a manner as hereinafter set forth, an apparatus of the class referred to, which is comparatively simple in its construction and arrangement, strong, durable, readily assembled, and comparatively inexpensive to set up.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a top plan view of a liquid lifting apparatus, in accordance with this invention.

Figure 2 is a side elevation, partly in section, of the apparatus.

Figure 3 is a section on line 3—3, Figure 2.

Figure 4 is a section on line 4—4, Figure 2.

Figure 5 is a section on line 5—5, Figure 2.

Figure 6 is a longitudinal sectional view of a modified form of vacuum controlling means.

Figure 7 is a section on line 7—7, Figure 6.

Figure 8 is a section on line 8—8, Figure 6.

Figure 9 is a sectional elevation of a modified form of operating mechanism for the vacuum controlling means.

Figure 10 is a fragmentary view in elevation of the form of operating mechanism shown in Figure 9.

Referring to Figures 1 to 5 of the drawings in detail, 1 denotes a base upon which the apparatus is mounted, and 2 indicates a body of water or other liquid from which the water or liquid is lifted to a higher level through the medium of the apparatus, in accordance with this invention.

The apparatus includes a pair of elevated, valved water or liquid receivers or tanks, a pair of valved liquid conducting pipes each leading to and discharging in a receiver, a vacuum controlling means common to the pair of receivers, operating means for said vacuum controlling means, and an auxiliary vacuum tank.

The auxiliary vacuum tank, which is indicated at 3, is mounted upon the base 1, and extending from the top thereof, as well as being secured therewith, is a supporting frame 4 for the pair of valved water or liquid receivers referred to generally by the reference character 5, 6, and which are spaced from each other.

The tank 3, centrally of its top, is formed with an intake opening 7 and at one side with an outlet 8, from which extends a valved pipe 9 opening into one end of a suction pump 10 driven by any suitable means. The suction pump 10 is fixedly secured, as at 11, to that side 12 of the tank formed with the outlet 8. It is to be understood, however, that the suction pump 10 can be arranged in any suitable position other than that as shown, and that the tank 3 dispensed with, and the frame 4 mounted directly on the base 1.

The suction pump 10 has fixedly secured thereto a vertically extending bracket 13 provided at its upper end with a bearing 14. Fixedly secured to the top wall 15 of the tank 3, is a pair of spaced standards 16, each provided with a bearing, as at 17, 17' arranged in alignment with the bearing 14. Driven from the suction pump 10, is the operating shaft 18 for the vacuum controlling means, and said shaft 18 is cranked, as at 19, and connected to the piston rod 20 of the pump 10 whereby on the operation of the pump 10 the shaft 18 will be driven. The shaft 18 is mounted in the bearings 14, 17 and 17' and projects at one end from the bearing 17'.

The water or liquid receiver 5 or 6 consists of a closed receptacle 21, having one side provided with a discharge outlet 22, which is closed by a valve 23, hinged at its upper end, as at 24, to that side 25 of the receptacle 21, formed with the opening 22. The top 26 of the receptacle 21 is provided with a pair of openings 27, 28. A water gage 29 is secured to and communicates with the interior of the receptacle 21. The water or liquid conducting pipe which associates with the receiver 5 is referred to generally by the reference character 30, and that which associates with the receiver 6 is referred to generally by the reference character 31. Each conducting pipe has its lower end provided with an intake valve 32 of the check type and its upper end formed with a discharge nozzle 33, which extends through the opening 27 into the receptacle 21. The discharge nozzle 33 is vertically disposed, whereas the body of the conducting pipe with which the nozzle 33 is attached extends downwardly and outwardly at an inclination with respect to the nozzle. The means for coupling the nozzle to the pipe with which it associates is indicated at 34, and consists of a pair of elbows connected together by a union and with one elbow coupled to the nozzle 33 and the other elbow with the conducting pipe. Each conducting pipe, intermediate its ends, is provided with a controlling valve 35 for regulating the flow of water therethrough or for shutting off the passage of water therethrough.

The vacuum controlling means comprises a pair of suction pipes referred to generally by the reference characters 36, 37, and as each of said pipes is of the same construction, but one will be described as the description of one will apply to the other. Each of the suction pipes includes four tubular sections 38, 39, 40 and 41. The sections 38 and 39 are connected together by an elbow coupling 42. The sections 39 and 40 are connected together by an elbow coupling 43, and the sections 40 and 41 are connected together by a T-coupling 44. The section 38 extends through the opening 28 into the receptacle 21 and is peripherally threaded for engagement therewith of a cage 45, which carries a float valve 46, for closing the suction pipe, for a purpose to be presently referred to. The section 39 is disposed at right angles with respect to the sections 38 and 40, and the sections 40 and 41 are vertically disposed and arranged in superposed relation. The lower terminal portion of the section 41 is peripherally threaded, as at 47. Connected to each of the suction pipes is a vacuum release pipe, referred to generally by the reference character 48 and which consists of an upper and lower tubular section 49, 50 respectively, and a pair of intermediate sections 51, 52, vertically disposed and arranged in superposed relation. The section 49 is connected to the T-coupling 44 and also to the section 41 by an elbow coupling 53. The section 51 has its inner terminal portion peripherally threaded, as at 54, and its outer terminal portion connected with the section 52 by an elbow coupling 55. The sections 51 and 52 are adjustably connected together by an annular coupling 56.

Arranged over the top of the vacuum tank 3 is a tapered valve housing 57, forming a tapered chamber 58, for a tapered valve 59. One end of the housing 57 has secured therewith a closure plate 60 formed with an opening 61 for the passage of a threaded protuberance 62, formed integrally centrally of the smaller end of the valve 59. A retaining nut 63 is carried on the outer end of the protuberance 62, and interposed between the nut 63 and the plate 60 is a washer 64. The valve 59 is mounted for rotation within the chamber 58, and the wall of the opening 61 provides a bearing for the protuberance 62. The valve 58, in proximity to its larger end, is formed with a diametrically extending port 65 and in proximity to its smaller end with a diametrically extending port 66. The top of the housing 57 is provided with an opening in proximity to each end thereof, and the wall of each of the openings is threaded. One of the openings is indicated at 67 and the other at 68, as clearly shown in Figures 4 and 5. Threadedly engaging with the wall of the opening 67 is the threaded lower terminal portion of the suction pipe 36, and threadedly engaging with the wall of the opening 68 is the threaded lower terminal portion of the suction pipe 37.

One side of the housing 57, centrally thereof, is formed with a pair of openings, each having the wall thereof threaded. One of the openings is indicated at 69 and the other at 70. Threadedly engaging with the wall of the opening 69 is the threaded inner terminal portion of the section 50 of the vacuum release pipe 48, which associates with the suction pipe 36, and threadedly engaging with the wall of the opening 70 is the threaded inner terminal portion of the section 50 of the vacuum release pipe 48, which associates with the suction pipe 37.

The other side of the housing 57, diametrically opposite the openings 69 and 70 is provided with a pair of spaced openings 71, 72, which communicate with the atmosphere.

The bottom of the housing is formed with a lengthwise extending passage 73 provided at each end with a branch, indicated at 74, 75, which open respectively into the larger and smaller ends of the chamber 58.

The port 65 is disposed at right angles to the port 66, or in other words the plane of the port 65 intersects the plane of the port 66, centrally thereof, and vice versa. The port 65 is adapted to register at one position of the valve 59 with the opening 67 and the branch 74, and at another position of the valve with the opening 69 and the opening 71. The port 66 is adapted to register at one position of the valve 59 with the opening 68 and branch 71 and at another position of the valve with the opening 70 and opening 72. When the port 65 registers with the opening 67 and branch 74, the port 66 registers with the openings 70 and 72, and when the port 66 registers with the opening 69 and branch 75 the port 65 registers with the openings 69 and 71.

Formed integral with the bottom of the housing 57 and fixedly secured to the top 15 of the vacuum tank 3 when the latter is employed, is a vertically extending hollow support 76 for the valve housing 57, and said support 76 provides a channel 77 which leads from the passage 73 to the opening 7, whereby communication is established between the tank 3 and the port 65 when the latter registers with the opening 67 and between the port 66 and the tank 3 when the former registers with the opening 68. When the port 65 registers with the opening 67 and branch 74, communication is established between the tank 3 and the suction pipe 36, and when the port 66 registers with the opening 68 and branch 75 communication is established between the tank 3 and the suction pipe 37. When communication is established between the suction pipe 36 and the tank 3, the position of the valve 59 is such that communication will be established between the suction pipe 37 and the atmosphere, and when communication is established between the suction pipe 37 and the tank 3, the valve 59 will be so positioned whereby communication is established between the suction pipe 36 and the atmosphere. When the tank 3 is not employed the channel 77 communicates with the suction pump.

The valve 59 is intermittently rotated and the shift being a quarter revolution at one time. The intermittent, predetermined shifts of the valve 59 are provided through the medium of an actuating mechanism, including an impulse member, intermittently engaging with a series of equi-distant spaced lugs 78, 79, 80 and 81 carried by a series of radially disposed arms 82, fixed to the outer end of the stem 83 of the valve 59. The stem 83 projects from the larger end of the valve 59 and the lugs carried by the arms 82 are arranged in the path of travel of the impulse member to be presently referred to. The lugs are disposed at right angles with respect to the outer ends of the arms 82.

Fixedly secured to the top 15 of the tank 3 is a vertical standard 84, having extending upwardly therefrom and at an inclination with respect thereto a supporting extension 85. Journalled in the support 84, near the top thereof, is a shaft 86 provided with a gear wheel 87 which meshes with a pinion 88, fixed to that end of the shaft 18 which projects from the bearing 17'. Journalled in the upper end of the extension 85 is a shaft 89 carrying a gear wheel 90 which meshes with the gear wheel 87. The shaft 89 loosely carries a crank arm 91 which constitutes the impulse member hereinbefore referred to. Extending from the inner end of the crank 91 is a weighted arm 91', engaged by a pin 92 on the gear 90, whereby the arm 91' will be carried therewith until off center, when the weight of the arm will cause it to fall quickly, carrying the impulse member therewith, whereby the latter will engage a lug of an arm 82 and give a quick impulse to the valve 59 to shift the same a quarter turn. The gear wheel 87 is of less diameter than the gear wheel 90. The train formed by the pinion 88 and gears 87 and 90 may be geared to any suitable ratio desired. Although the construction shown provides for the intermittent shifting of the valve to equal a quarter revolution thereof, yet it is obvious that the mechanism can be set up to provide for a different extent of shift of the valve and the latter and the housing would be changed to provide for the same.

When operating, the air is first pumped out of the receiver 5 until the necessary vacuum is attained, and then receiver 5 fills with water through pipe 30 as the valve 35 thereof has been opened. Although the pipe is shown entering the top of the receptacle, yet it is to be understood that it can enter at any point desired. When the receiver 5 has been supplied with water to the desired extent, the train of gearing will at this time provide for the impulse member to shift the valve 59 a quarter turn, thereby establishing communication between the receiver 5 and the atmosphere, breaking the vacuum. When the vacuum is released in receiver 5, the pressure of the water therein will open the valve 22 and the water empties from the receiver. When the valve 59 is shifted to establish communication between the receiver 5 and the atmosphere, thereby releasing the vacuum therein, the vacuum is created in receiver 6 and the operation as referred to in connection with receiver 5 takes place. When the valve is again shifted to establish communication between the receiver 5 and the suction pump, the valve 22, through suction, immediately closes and prepares receiver 5 for another supply of water, and the same operation takes place with respect to valve 22 for the receiver 6.

The valve 46, in each of the receivers, is designed to close its respective suction pipe when the receiver is full of water thereby keeping the water out of the suction pump.

When air is admitted through a vacuum release pipe the float valve drops to the bottom of its cage.

The apparatus provides means for alternately filling a pair of water or liquid receivers, by lifting water or liquid from a lower level and further for alternately discharging the lifted water or liquid from the receivers automatically, the lifting of the water or liquid being had by alternately creating and releasing vacuums in the water receivers. The auxiliary vacuum tank is provided for maintaining a partial vacuum therein and which assists in the creating of the vacuum in either of the receivers.

With reference to the modified form of vacuum controlling means shown in Figures 6, 7 and 8, the suction pipes indicated at 93, 94, are not provided with the vacuum release pipes 49 as shown in Figures 1 and 2, but in lieu thereof a release channel associated with each suction pipe 93, 94, is formed in the housing 95 for the valve 96. The openings in the housing 95, for the pipes 93, 94 are indicated at 96, 97 respectively, and diametrically opposite the outlet openings, 98, 99 formed in the housing 95, the latter is formed with a pair of inwardly opening pockets 100, 101 respectively, in lieu of the openings 69 and 70. The suction pipes 93, 94, extend only within the outer portions of the openings 93, 94. Communicating with the opening 93 and opening into the pocket 100 is a vacuum release channel 102, and communicating with the opening 94 and opening into the pocket 101 is a vacuum release channel 103. The channels 102 and 103 are formed in the body of the housing. The ports 104 and 105, in the valve 96, are adapted to alternately register with the pockets 100 and 101. Otherwise than that as stated, the vacuum controlling means shown in Figures 6, 7 and 8 is the same as that shown in Figures 1 and 2.

The operating mechanism shown in Figure 9 for the vacuum controlling means is of the combined float and spring controlled type, but includes a counterbalanced impulse member of the same construction as that shown in Figure 3.

With reference to Figure 9, the vacuum controlling means of the type shown in Figures 6, 7 and 8 is referred to generally by the reference character 106 and is arranged between a pair of spaced supports 107, 108. Journalled in the upper end of each of said supports is a shaft 109 carrying a winding spool 110, formed with a pair of peripheral grooves 111, 112. One end of each of the spools is formed with a laterally extending pin 113. Loosely mounted on each shaft 109 is an impulse member 114 formed with a weighted arm 115, which provides a counterbalance therefor. The lugs of the arms 82 are positioned in the path of the impulse member 114. Winding on and off the spool 110, at the grooved portion 112 thereof, is a float operated flexible member 116. One of said members extends into the receiver 5 and the other into the receiver 6, and has its upper end provided with a float 117. When the water or liquid is supplied to the receiver, the float 117 elevates the member 116 and revolves the spool 110 in the direction of the arrow, Figure 9, and during the revolving of the spool the pin 113 will engage the arm 115 and shift the same until it moves off center when said arm 115 will drop, thereby actuating the impulse member to quickly engage a lug of an arm 82 and shift the valve of the vacuum controlling means. Winding on and off the spool 110 in the grooved portion 111 thereof is a spring controlled flexible member 118 and the function of which is to turn the spool 110 to normal position, which is with the float 117 in a lowered position within a receiver and the member 116 wound on the spool 110. The member 118 revolves the spool in an opposite direction with respect to the revolving of the spool by the member 116 and when the spool is revolved by the member 118 the pin 113 will restore the impulse member to a position whereby the arm 115 will be arranged in the path of the pin 113 so that the arm 115 will be shifted by the pin 113 of the spool 110 when the member 116 is unwound from the spool, due to the action of the float 117. The members 116 and 118 are set up to provide for a complete revolution of the spool 110, that is to say the member 116 will impart a complete revolution to the spool 110 and the member 118 will also impart a complete revolution to the spool.

It is thought the many advantages of a water lifting apparatus, in accordance with this invention, can be readily understood, and although the preferred embodiment of the invention is as illustrated and described, yet it is to be understood that changes in the details of construction can be had which fall within the scope of the invention as claimed.

What we claim is:—

1. A liquid lifting apparatus comprising a pair of receivers supported in elevated position with respect to a source of supply, conducting pipes extending from said supply and into the upper portion of each of said receivers, a suction pipe extending into the upper portion of each receiver, and an intermittently operable valve mechanism provided with means common to and alternately communicating with the outer ends of said suction pipes for alternately forming a vacuum in said receivers to provide for the alternate lifting of the liquid from the supply to said receivers and for alternately establishing communication between said receivers and the atmosphere to alternately release the vacuum in said receivers, each of said receivers provided with valvular means carried thereby above and in proximity to the bottom thereof for the automatic discharge of the liquid therefrom when the vacuum is released therein.

2. A liquid lifting apparatus comprising a pair of receivers supported in elevated position with respect to a liquid supply, a suction pump, a conducting pipe leading from said supply to each receiver, a valved suction pipe associated with each receiver and having opening thereinto above the outer end thereof a vacuum release means, a valve mechanism provided with means common to and communicating with the outer ends of the suction pipes and with said vacuum release means for alternately creating a vacuum in said receivers and for alternately releasing the vacuum in said receivers, said mechanism further communicating with said suction pump, and means for intermittently operating said means of said mechanism to provide for the alternate forming and releasing of a vacuum in one receiver with respect to the other.

3. A liquid lifting apparatus comprising a receiver, a conducting pipe extending from a source of supply to said receiver through the top thereof, a suction pipe opening into said receiver through the top thereof, vacuum release means communicating with said suction pipe above the outer end of the latter, and a valve mechanism including an intermittently operated valvular element common to and provided with means communicating with said pipe and vacuum release means for alternately forming and releasing a vacuum in said receiver to provide for the intermittent lifting of liquid from the supply to the receiver, and means carried by the receiver and in proximity to the bottom thereof to provide for the automatic discharge of the liquid from the tank when the vacuum is released therein.

4. A liquid lifting apparatus comprising a pair of receivers supported in elevated position with respect to a liquid supply, a suction pump, a conducting pipe leading from said supply to each receiver, a valved suction pipe extending into and associated with each receiver and having associated therewith near its outer end a vacuum release means, a valve mechanism including an intermittently operable ported valve element common to and having its ports for selective communication with said suction pipes and said means for alternately creating a vacuum in said receivers and for alternately releasing the vacuum in said receivers, said ports of said element further selectively communicating with said suction pump, and means for intermittently operating said element to provide for the alternate forming and releasing of a vacuum in one receiver with respect to the other, said last mentioned means including a counterbalanced impulse member intermittently shifting said element.

5. A liquid lifting apparatus comprising a receiver, a conducting pipe extending from a source of supply to said receiver, a suction pipe opening into said receiver, vacuum release means communicating with said suction pipe, a valve mechanism including an intermittently revoluble valve associated with a suction pump and common to said pipe and vacuum release means for alternately forming and releasing a vacuum in said receiver to provide for the intermittent lifting of liquid from the supply to the receiver, said valve including a plurality of ports for alternate registration with said pipe and means for alternately opening and closing said pipe to the pump and atmosphere and for intermittently closing said means to the atmosphere, valvular means on said receiver to provide for the automatic discharge of the liquid therefrom when the vacuum is released therein, and an operating mechanism for said valve and including an intermittently operating counterbalanced impulse member contacting with and operating said valve a part revolution at predetermined intervals.

In testimony whereof, we affix our signatures hereto.

WILLIAM R. POLSON.
HARRY C. EVANS.